United States Patent [19]

Dockal et al.

[11] 4,288,186
[45] Sep. 8, 1981

[54] PIT CUTTER APPARATUS

[75] Inventors: Rodney O. Dockal, Alvin; Harold A. Lindsey, Houston, both of Tex.

[73] Assignee: AMF Incorporated, White Plains, N.Y.

[21] Appl. No.: 100,779

[22] Filed: Dec. 6, 1979

[51] Int. Cl.³ .............................................. B23C 1/20
[52] U.S. Cl. ................................. 409/175; 51/241 S; 408/76; 409/181; 409/184
[58] Field of Search ............... 409/187, 188, 185, 184, 409/175; 408/76, 234, 14; 51/241 S

[56] References Cited

U.S. PATENT DOCUMENTS

| | | | |
|---|---|---|---|
| 1,396,885 | 11/1921 | Sanchez | 408/76 X |
| 1,889,653 | 11/1932 | Gorton | 409/184 |
| 2,863,338 | 12/1958 | Stewart | 408/76 |
| 3,166,985 | 1/1965 | Stanley | 409/181 |
| 3,387,509 | 6/1968 | Lupear | 408/76 |
| 3,596,558 | 8/1971 | Rydell | 408/764 |

Primary Examiner—William R. Briggs
Attorney, Agent, or Firm—George W. Price; John H. Gallagher

[57] ABSTRACT

Apparatus for accurately cutting pits or anomalies in steel pipe or plate stock to be used as a standard for calibrating magnetic flux leakage detection equipment used for testing for anomalies in such stock.

7 Claims, 4 Drawing Figures

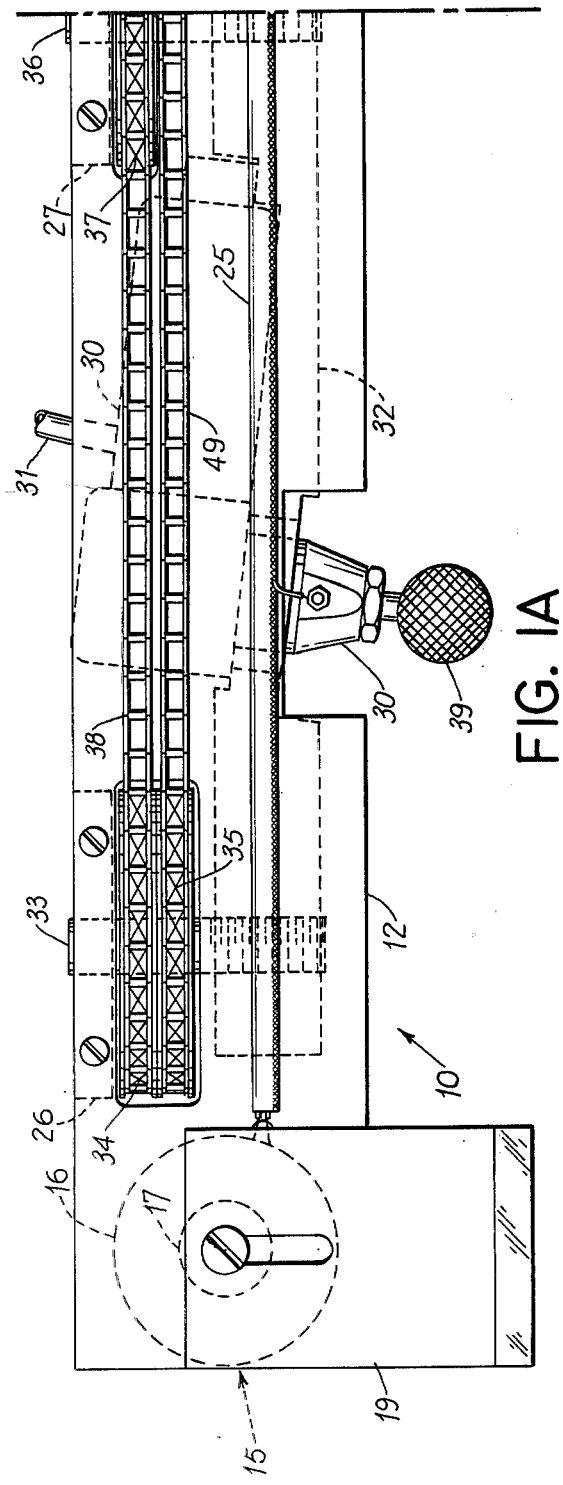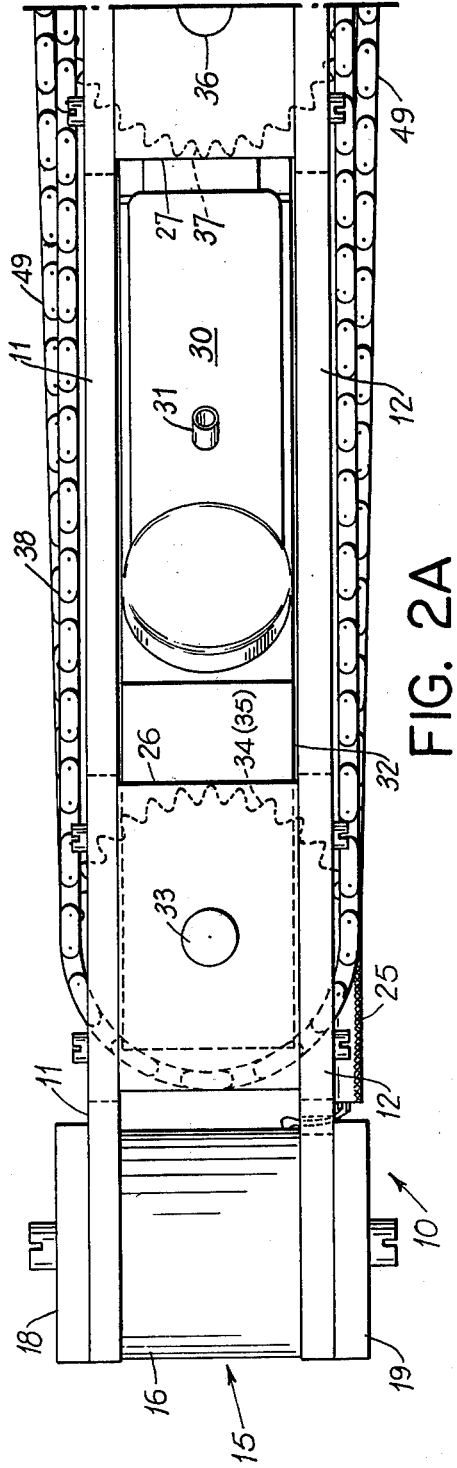

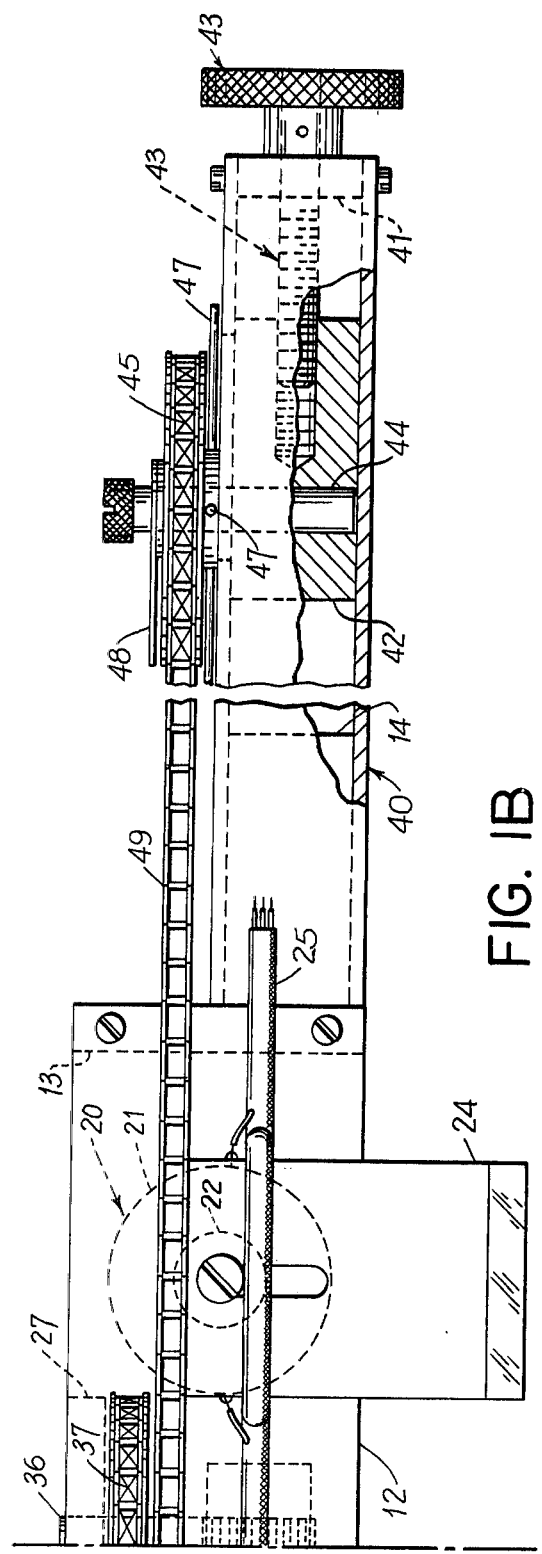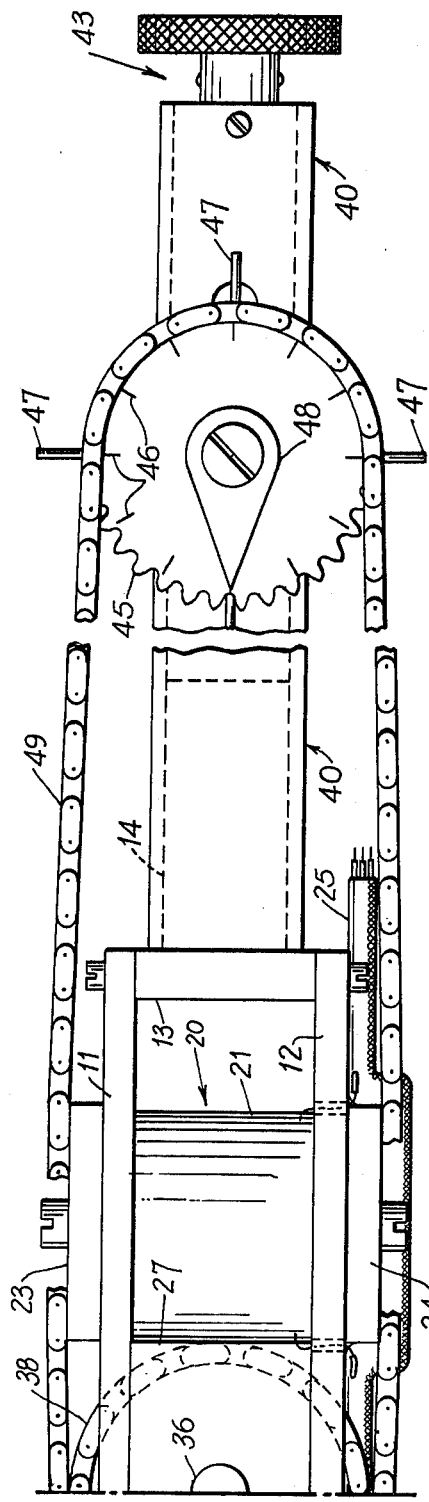

PIT CUTTER APPARATUS

This invention relates generally to non-destructive testing or inspection of steel pipe and plate material and more particularly, for accurately providing anomalies in material to be inspected for accurately calibrating electronic equipment associated with such inspection.

One technique of non-destructive testing of tubular stock utilizes detection of magnetic flux leakage around pits, cracks and other anomalies in the stock. It should be noted that this technique can also be used for testing sheet material. The electronic equipment used for such testing must be accurately calibrated to compensate for magnetic variables produced by pipe diameter, wall thickness and material grade. After this primary calibration is complete, further calibration is required to provide a reliable interpretation of the severity of the defects or anomalies encountered during testing. This secondary calibration is best accomplished by utilizing a standard of the same stock to be tested having man made defects and adjusting the read-out value of the equipment to accurately correspond to the known severity of the manufactured defects.

Up to this time it has been cumbersome, expensive and time consuming to produce or manufacture defects in test standards. In many instances such defects are difficult to accurately produce especially in the internal surfaces of pipe and often impossible to make without creating undesirable secondary defects or anomalies.

Accordingly, an object of the present invention is to provide improved apparatus for accurately producing defects in metal stock, particularly steel, to be tested.

Another object of the present invention is to provide the foregoing apparatus which can be used with equal facility on concave, convex and flat surfaces.

And, another object of the present invention, is to provide the foregoing apparatus which is relatively easy to use to accurately produce desired defects or anomalies without the creation of unwanted secondary anomalies.

The foregoing and other objects and advantages will appear more fully hereinafter from a consideration of the detailed description which follows, taken together with the accompanying drawings, wherein a single embodiment of the invention is illustrated by way of example. It is to be expressly understood, however, that the drawings are for illustration purposes only and are not to be construed as defining the limits of the invention.

FIGS. 1A and 1B when put together end to end form an elevational view of a tool or apparatus made in accordance with the present invention.

FIGS. 2A and 2B when put together end to end form a plan view of the tool or apparatus of FIGS. 1A and 1B.

Referring now to the drawings, a tool or apparatus made in accordance with the present invention is provided with a main body or frame 10, elongated along its longitudinal axis, having a spaced pair of parallel side walls 11 and 12 connected together at the rear or back end of the frame by an end wall 13 with a block or block portion 14 extending rearwardly therefrom for receiving a tubular extension frame 40, as will be further discussed.

An electro-magnetic hold-down assembly 15 is provided at the forward or front end of the frame 10, and comprises a coil 16 with a core 17 supported at its ends by the side walls 11 and 12. A pair of spaced parallel legs 18 and 19 are connected each to a different end of the core 17 and depend therefrom a distance below the main frame 10. The legs 18 and 19 are each provided with a vertical slot for length adjustment, and the bottom surfaces of the legs are provided with a suitable profile to facilitate maximum contact with the surface of the standard to be engaged.

A similar electro-magnetic hold-down assembly 20, longitudinally spaced from hold-down assembly 15, is provided at the rear end of the frame 10, and comprises a coil 21 with the ends of its core 22 supported by the side walls 11 and 12, and a spaced pair of parallel legs 23 and 24, connected to opposite ends of the core, which depend therefrom a distance below the main frame 10. Like legs 18 and 19, legs 23 and 24 are provided with vertical slots for length adjustment and with suitably profiled bottom surfaces.

The coils 16 and 21 are connected together and to a current source (not shown) by a suitable electrical cable 25 having a conventional switch means (not shown). The coils 16 and 17 are preferably wired in series to insure against use of the apparatus when only one electro-magnetic hold-down assembly 15 or 20 is energized.

A pair of horizontal plates or members 26 and 27 extend between and are connected to the upper portions of side walls 11 and 12. Member 26 is disposed adjacent to and just rearwardly from the hold-down assembly 15 and member 27 is disposed adjacent to and just forwardly of hold-down assembly 20.

A fluid motor 30, preferably pneumatic, provided with a power connection 31, is disposed within the frame 10 and is mounted on a carriage or mount 32. The front end of the carriage or motor mount 32 is engaged by the lower threaded end of a rotable shaft 33 which is journalled at its upper end in the plate 26. A pair of sprockets 34 and 35 are fixedly mounted side by side on the shaft 33 between the plate 26 and the motor mount 32. The rear end of the carriage or motor mount 32 is engaged by the lower threaded end of a rotable shaft 36 which is journalled at its upper end in the plate 27. A sprocket 37 is fixedly mounted on the shaft 36 in horizontal alignment with the sprocket 34, and is disposed between the plate 27 and the motor mount 32. A chain loop 38 is engaged by and drivingly connects the sprockets 34 and 37 together.

Because of the interconnection provided by the sprockets 34 and 37 with the chain 38, when one of the shafts 33 or 36 is rotated the other of said shafts will be similarly rotated. Because of the threaded engagement of the motor mount 32 with the shafts 33 and 36, rotation of the shafts will vertically raise or lower, depending upon the direction of rotation of the shafts, the motor mount 32 and the motor 30. The motor 30 is electrically isolated from the rest of the tool or apparatus in any suitable conventional manner which can be accomplished with facility by making the motor mount 32 of a dielectric material. A third wire of the electrical cable 25 is connected to the motor 30, the purpose of which will be discussed in the description of operation. The motor 30 preferably is provided with a right angle drive, as shown, which receives a suitable cutter means such as a solid carbide ball burr 39 of a known predetermind size.

The rearwardly extending block 14 is fitted into the front end of the tubular extension frame 40 which forms a socket for the block. The rear end of the extension frame 40 is closed by a plate 41 in which is journalled a tensioning or tension adjusting member 43 which threadedly engages a support block 42 slidable within the extension frame 40. A sprocket 45 is fixedly mounted on a vertical shaft 44, which, in turn, is carried by the block 42. The sprocket 45 is provided with a depth-of-cut indicia 46 on its upper surface and means for being manually rotated, such as pins 47. A pointer 48 is connected to the upper end of shaft 44. Because of friction, pointer 48 is moved by rotation of the sprocket 45 but may be moved independently by overcoming the friction for adjusting the position of the pointer relative to the indicia 46.

A chain loop 49 is engaged by sprockets 35 and 45 which provide a driving connection to the shaft 33, and through the sprockets 34 and 37 and chain 38 to shaft 36. The tension on the chain 49 is adjusted manually by rotating the tensioning member 43 causing the block 42 to move axially in the extension frame 40. Conventional means, such as a detent, pin or set screw, can be provided to lock the extension frame 40 to the block 14. However, the chain 49, when properly tensioned for operation, will prevent separation of the extension frame 40 from the main frame 10.

OPERATION

In operation, the motor 30 is provided with a ball burr 39 of predetermined size, and legs 18, 19, 23 and 24 with bottom surfaces suitably profiled to the shape of the surface of the standard to be contacted appropriately adjusted. The apparatus is positioned in the pipe or on the test plate with the legs 18, 19, 23 and 24 in contact with the surface of the pipe or plate. The electrical cable 25 is then connected by the switch means (not shown) to a suitable power source; for example, a 12 volt battery or a controlled D.C. source capable of providing 2 amps of current for simultaneously energizing both electro-magnetic hold-down assemblies 15 and 20 to lock the apparatus in position.

The tension adjusting means 43 is rotated as required to remove slack from the chain 49. By use of the means 47, the sprocket 45 is manually rotated causing the chain 49 to drive the sprocket 35 and shaft 33 to rotate. This causes the sprocket 34 to rotate and through the chain 38 and sprocket 37 causes the shaft 36 to rotate with the shaft 33. Rotation of shafts 33 and 36 in the appropriate direction lowers the motor 32 and motor mount 30 until the burr 39 contacts the surface of the pipe or plate. Positioning of the burr 39 can be done by the feel of contact resistance transmitted back to the manual operating means 47.

However, it is preferable to connect the motor 30 through the third wire of cable 25 to one side of a low voltage D.C. source while the other side of the D.C. source is connected to the pipe or plate. One of the connections to the low voltage D.C. source is provided with a continuity detector which will turn on when circuit is closed by the burr 39 contacting the surface of the pipe or plate.

The motor 30 and the pipe or plate are disconnected from the low voltage D.C. source, and the pointer 48 is appropriately located or positioned relative to the depth-of-cut indicia 46 at an angle off-set from the longitudinal axis of the extension frame 40 or zero position, which corresponds to the desired depth of the pit to be cut.

Pressure fluid is now admitted to the connection 31 to drive the motor 30 and burr 39. The sprocket 45 is now manually rotated to bring the pointer 48 back to its zero position as shown in FIG. 2B. At this point, the pit has been cut accurately to its predetermined depth and is of a predetermind diameter depending upon the size of the burr 39.

It is best to rotate the sprocket 45 in the opposite direction to withdraw the burr 39 from the pit. The pressure fluid to the motor 30 and current to the electro-magnetic hold-down assemblies 15 and 20 are cut-off thus permitting removal of the apparatus.

Although a single embodiment of the invention has been illustrated in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for accurately making an anomaly of predetermined size and depth in the surface of a standard for calibrating an instrument for non-destructive testing for such anomalies and indicating the severity thereof, comprising frame means elongated along its longitudinal axis;

a pair of electro-magnetic hold-down means mounted on said frame means each having a laterally spaced pair of legs depending from said frame means for contacting the surface of the standard;

one of said hold-down means being disposed adjacent the front end of said frame means and the other of said hold-down means being longitudinally spaced therefrom intermediate the ends of said frame means;

motor means disposed between said hold-down means and having cutting means of predetermined size depending therefrom for making an anomaly in the surface of the standard when rotatably driven by said motor means;

means movable relative to said frame means for mounting said motor means and moving said motor and cutting means toward and away from the surface of the standard;

means adjacent the rear end of said frame means for manually moving said mounting means and having adjustable means for indicating when said cutting means has moved a predetermined depth into the standard;

a pair of rotatable shafts journaled in said frame means each threadedly engaging a respective end region of said motor mounting means;

means drivingly connecting said pair of rotatable shafts together; and means drivingly connecting said means adjacent the rear end of said frame means to one of said pair of shafts for manually rotating said pair of shafts in unison to move said motor mounting means relative to said frame means.

2. Apparatus in accordance with claim 1, and said frame means comprising a main frame having a laterally spaced pair of side walls and an end wall connecting said side walls together at the rear end of said main frame; and an extension frame connected to said end wall and extending rearwardly from said main frame.

3. Apparatus in accordance with claim 2 wherein each of said pair of electro-magnetic hold-down means is disposed adjacent a respective end of said main frame, and comprising a coil, a core extending through said coil and having its ends supported by said side walls; and each of said pair of legs being connected to opposite ends of a respective core.

4. Apparatus in accordance with claim 3, and means for electrically connecting said coils of said hold-down means in series to an electrical source.

5. Apparatus in accordance with claim 1 or 4, and said means drivingly connecting said pair of rotatable shafts together, comprising a sprocket and chain drive having a different one of said sprockets thereof fixedly mounted on each of said shafts.

6. Apparatus in accordance with claim 5, and said means adjacent the rear end of said frame means comprising a vertical shaft and a manually rotatable sprocket fixedly mounted on said vertical shaft and having indicia on its upper surface;

said adjustable means comprising a pointer connected to the upper end of said vertical shaft and rotatable with said manually rotatable sprocket due to friction at the connection;

a second sprocket fixedly mounted on one of said pair of rotatable shafts; and chain means engaged by and drivingly connecting said second sprocket and said manually rotatable sprocket together.

7. Apparatus in accordance with claim 6, and said pointer being rotatable relative to said manually rotatable sprocket by overcoming the friction to position the pointer relative to said indicia.

* * * * *